United States Patent [19]

Norrod

[11] Patent Number: 4,564,988
[45] Date of Patent: Jan. 21, 1986

[54] APPARATUS FOR FITTING A BOOT TO A UNIVERSAL JOINT

[76] Inventor: Lutro Norrod, 3137 Hobart Ave., Kettering, Ohio 45429

[21] Appl. No.: 651,132

[22] Filed: Sep. 17, 1984

[51] Int. Cl.$^4$ ............................................. B23P 19/02
[52] U.S. Cl. ..................................... 29/235; 29/237; 29/238; 29/256; 29/282; 29/283; 277/1; 277/9.5; 277/11
[58] Field of Search ................. 29/256, 238, 237, 235, 29/283, 450, 252, 282; 277/1, 9.5, 11

[56] References Cited

U.S. PATENT DOCUMENTS

| | | | |
|---|---|---|---|
| 245,056 | 8/1881 | Callahan | 29/256 X |
| 1,094,978 | 4/1914 | Church | 29/256 X |
| 2,485,022 | 10/1949 | Taylor | 29/283 |
| 2,618,051 | 11/1952 | Endicott | 29/235 |
| 2,917,893 | 12/1959 | Kausche | 59/7 |
| 2,924,954 | 2/1960 | Ponhard | 464/903 X |
| 3,146,522 | 9/1964 | Wright | 29/256 |
| 3,174,218 | 3/1965 | McConaha | 29/156 |
| 3,432,172 | 3/1969 | Hendrickson | 277/11 X |
| 3,458,920 | 8/1969 | Crump | 29/238 X |
| 3,781,963 | 1/1974 | Felser, Jr. | 29/283 X |
| 3,886,644 | 6/1975 | Koch, Jr. | 29/270 |
| 4,116,020 | 9/1978 | Aucktor et al. | 464/903 X |
| 4,120,082 | 10/1978 | Bond | 29/254 |
| 4,133,557 | 1/1979 | Ahistone | 29/237 X |
| 4,167,057 | 9/1979 | Traynor | 29/283 |
| 4,257,135 | 3/1981 | Moebius | 29/237 X |
| 4,345,361 | 8/1982 | Baumann | 29/237 |

Primary Examiner—Charlie T. Moon
Attorney, Agent, or Firm—Biebel, French & Nauman

[57] ABSTRACT

A tool for press fitting a circular end of a flexible boot onto the outer race of a constant velocity joint using a press fit endless band clamp fitted to the end of the boot, comprises a main plate member having at least two parts which cooperate to define a circular aperture of a diameter such as to pass around the end of the boot but not around the band clamp and also greater than the outer diameter of the end of the boot, the parts of the main plate member being separable to set the main plate member around the end of the boot. A secondary plate is adapted to fit to the outer race opposite the band clamp and means are provided for drawing said plates toward each other to move the main plate member coaxially and uniformly along a cylindrical surface on the outer race, forcing the band clamp and the end of the boot fitted thereto onto such surface and simultaneously compressing the end of the boot into tight sealing engagement with the surface of the outer race.

4 Claims, 9 Drawing Figures

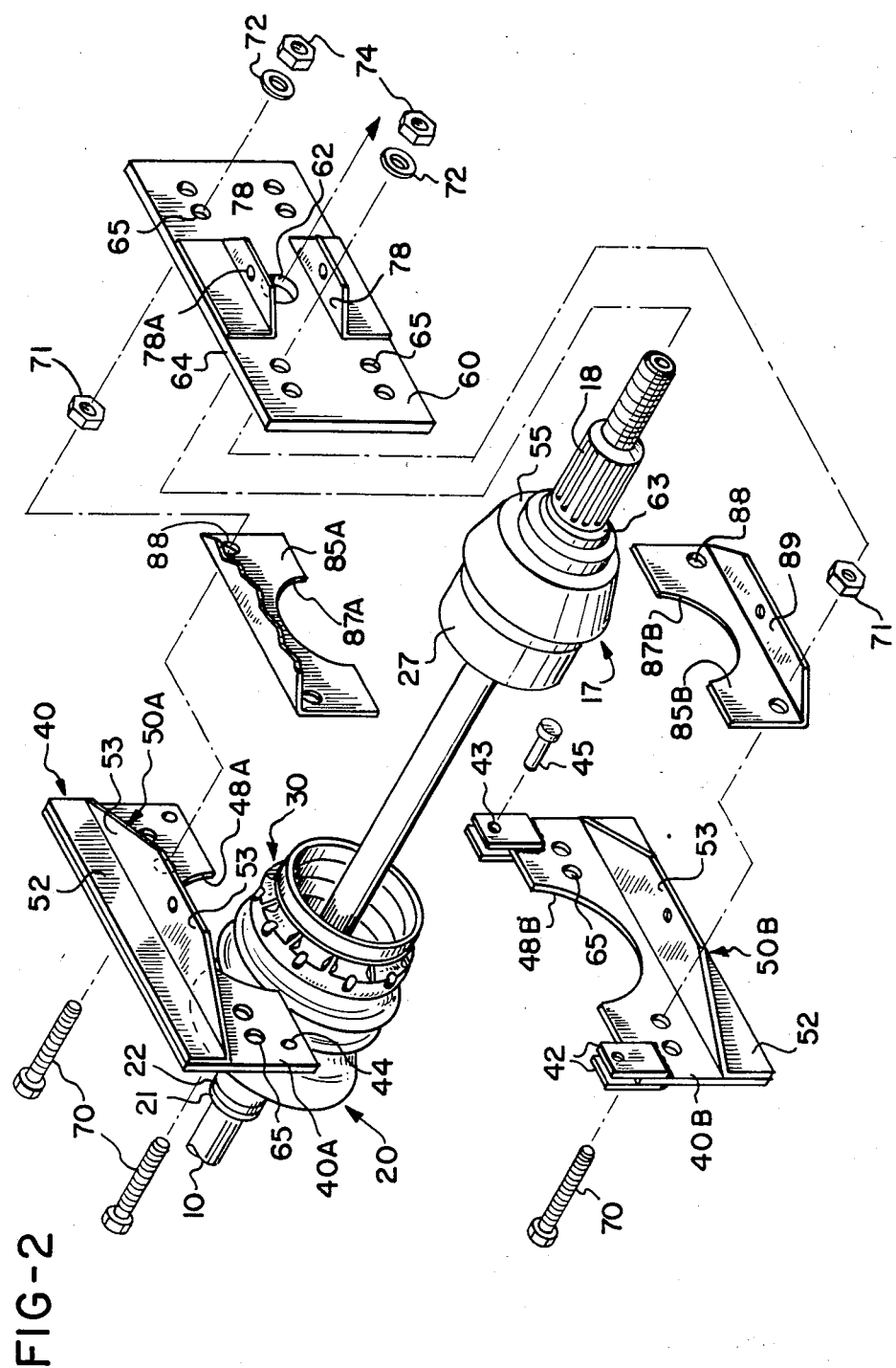

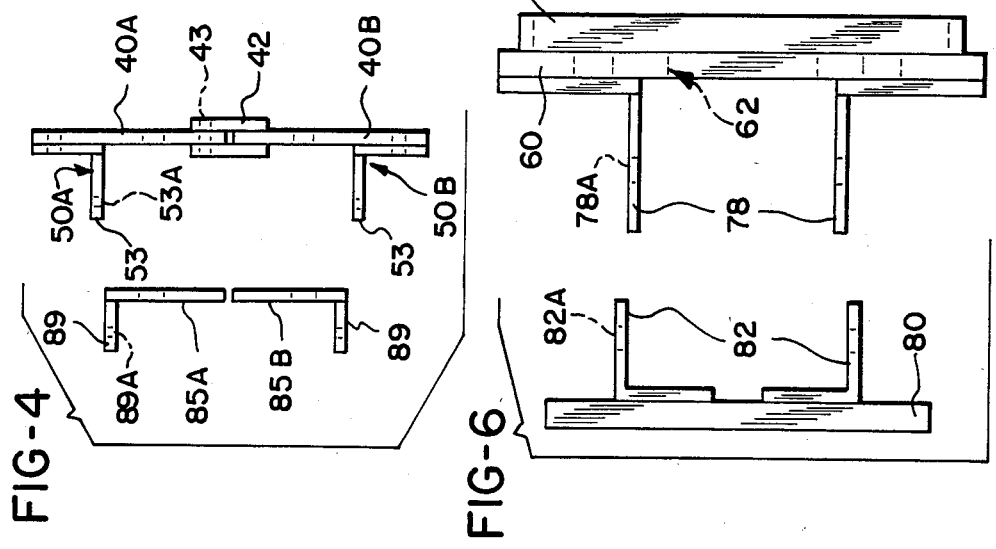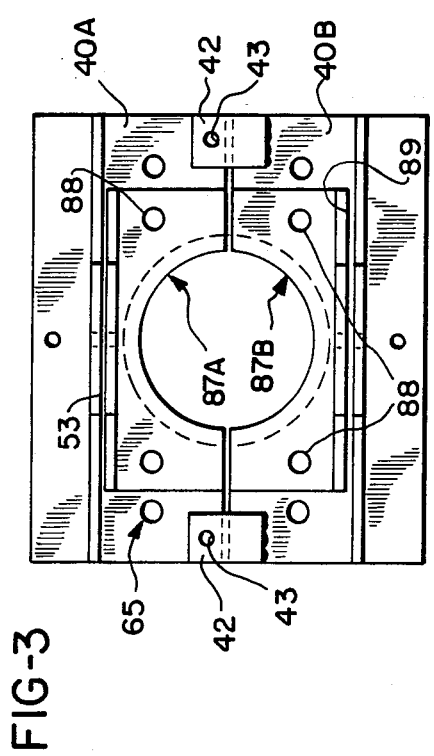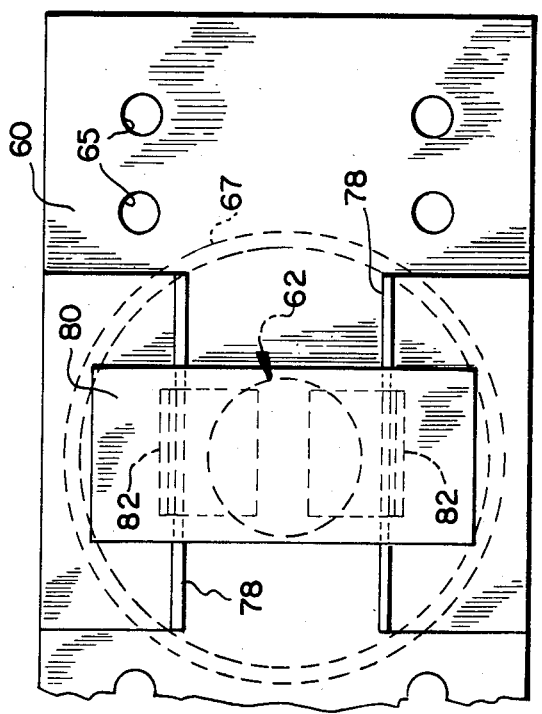

APPARATUS FOR FITTING A BOOT TO A UNIVERSAL JOINT

BACKGROUND OF THE INVENTION

This invention relates to the fitting of flexible protective covers, commonly known as boots, to universal joints, particularly where such joints are used in automotive service. In older style automotive designs using front engine/rear axle layout the universal joints used in the drive train are generally of the Cardan type, fitted with bearing bushings as a rule, and exposed to the elements. If any provision for protection of such a joint was provided, it might be in the form of grease fittings leading to the interior of the bushings to provide for pressure application of lubricating grease, but as a rule no outer protective cover was used. In more modern front engine/front split axle designs it is necessary to use constant velocity universal joints between the outer ends of each axle shaft and the associated wheel spindle, to accomodate the substantial misalignment of the pindles and axle shafts necessary for steering. This had led to an increasing need for maintenance and repair of these constant velocity joints. Due to the more complicated construction and operation of constant velocity joints, it is desirable to fit them with a flexible cover or boot so as to contain appropriate lubricant and to protect the races, the bearings, and the spline connection between the end of the axle and the inner race of the joint.

A number of automotive designs, particularly those of General Motors, use an endless band clamp which has a central or main part of generally U-shape in cross-section to contain the larger annular end of a flexible boot, and an integral lip which has a press fit to a cylindrical surface on the exterior of the universal joint, usually on the surface of the outer race. To install a new boot mechanics have customarily been required to assemble the parts of the joint, support them in some way, and force the band clamp onto the aforementioned cylindrical surface. No specific tool has been provided for this purpose, and in many cases mechanics have merely accomplished this task by striking the band clamp repeatedly around its diameter with a blunted cold chisel or similar tool.

This process can lead to damage to the band clamp or the boot, by cutting, pinching, or tearing, and of course any loss in the integrity of the seal normally provided by the boot will lead to damage and/or destruction of the expensive constant velocity joint. Therefore there exists a need for a tool which will facilitate this task and minimize the likelihood of damage to the boot or seal.

A number of devices are described in U.S. patents which are capable of applying (and in some cases removing) gears, bushings and other bearings, and similar parts to shafts or the like, in a press fit situation. However none of these provides for the simultaneous fitting of a protective cover or boot and the necessary protection thereof to maintain the integrity of the resultant sealed cover. Typical such prior patents are U.S. Pat. No. 2,485,022 issued Oct. 18, 1949; U.S. Pat. No. 3,174,218 issued Mar. 23, 1965; U.S. Pat. No. 3,146,522 issued Sept. 1, 1964; U.S. Pat. No. 4,120,082 issued Oct. 17, 1978; U.S. Pat. No. 2,917,893 issued Dec. 22, 1959; and U.S. Pat. No. 3,886,644 issued June 3, 1975.

SUMMARY OF THE INVENTION

The present invention provides an apparatus, principally a tool, and a method for the quick, uniform and secure installation of press fitted band clamps and associated boot to universal joints and the like. The apparatus comprises essentially a unique split main plate which defines an opening sized to be greater in diameter than the end of the boot which is fit to or associated with the band clamp, so as not to pinch or tear the boot, but of less diameter than the outer diameter of the main part of the band clamp so as to enable moving the clamp onto the cylindrical surface of the joint with a force which is applied essentially uniformly around the clamp. The motion of the main plate may easily be observed to allow the mechanic to limit its travel along the aforementioned cylindrical surface, thus preventing movement of the band clamp beyond the limits of its designated position on the joint. The main plate also includes a centering means, in the form of a protruding ring concentric with the opening, to interact with the large outer race of the inner constant velocity joint used on some front axle assemblies.

A means for pressing the fitted main plate along the universal joint is also provided, preferably in the form of a secondary plate designed to be fitted to the spindle end of the universal joint, opposite the boot. Adjustable clamping bolts, or equivalent mechanical or hydraulic devices, extend between the two plate members and provide the necessary force to press fit the band clamp onto the cylindrical surface of the outer race of the joint. This secondary plate may also include an optional press plate which adapts the tool, along with the joint being repaired, to be set into a general purpose shop press to apply the necessary pressure. In addition, the secondary plate is needed for repair work on the larger inner joints.

Since this type of universal joint construction is used in several sizes, appropriate reducer/adapter plates are also provided for easy attachment to the main plate, so the tool can quickly be fitted to the correct desired dimensions. Preferably the reducer plates co-act with the aforementioned stops to align them accurately to the tool.

The method of the invention consists of additional steps to the normal ones required to re-assemble the universal joints in question together with their protective boots. Essentially the method provides that, after the inner end of the boot is fitted to the axle shaft and the races and bearings are assembled in correct position, the main split plate of the tool is, while separated, placed around the outer end of the boot, next to the band clamp, and the plate is then closed or joined. Then the main plate is forced along the cylindrical surface of the outer race of the joint, moving the band clamp along before it, and carrying the outer end of the boot, which is engaged in the clamp, along with it until the band clamp is properly seated. No pressure is exerted by the tool directly to the boot, and there is sufficient clearance between the boot and the closed main plate that the boot is not pinched or caught by the plate, but instead the end of the boot is uniformly clamped to the surface and carried along with the band clamp to the desired location.

The principal object of the invention, therefore, is to provide a novel apparatus and method for installing a protective boot over a universal joint along with the press fit band clamp that holds the large end of the boot to the joint; to provide a tool for this purpose which includes a main split plate defining an aperture designed to engage the band clamp while clearing the adjacent part of the boot; to provide such a tool capable of use in repair of both outer and inner universal joints on a front drive axle assembly; to provide also adapter plates for use of the tool with different sizes of joints, and for use of the tool in conjunction with a shop hydraulic press.

Other objects and advantages of the invention will be apparent from the following description, the accompanying drawings and the appended claims.

BRIEF DESCRIPTION OF THE DRAWINGS

FIG. 2 is a view similar to FIG. 1 including the basic parts of the tool provided by the invention;

FIGS. 3 and 4 are front and side views, respectively, of the main plate with the optional reducer attachment;

FIGS. 5 and 6 are front and side views, respectively, of the secondary plate and optional press adapter plate;

DESCRIPTION OF THE PREFERRED EMBODIMENT

Figure 1:
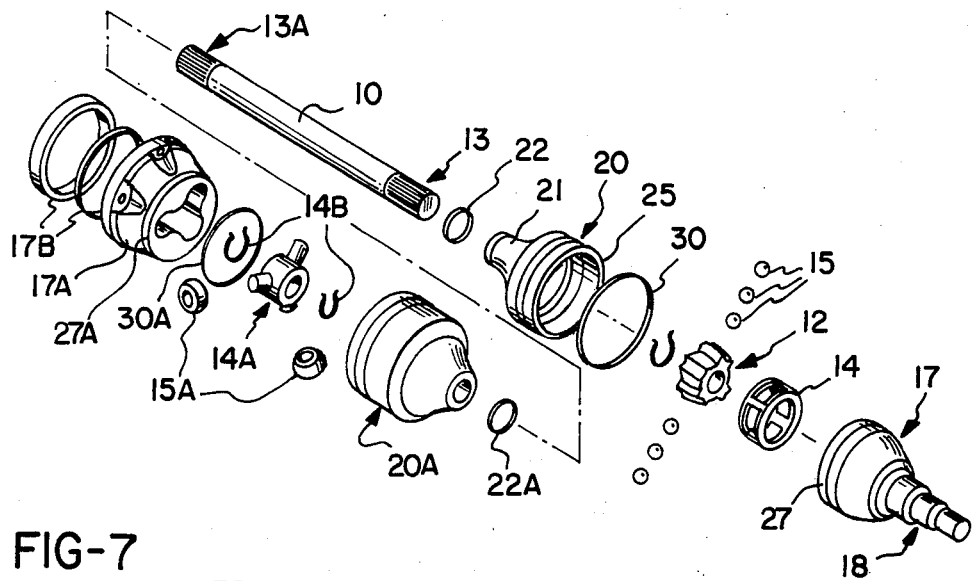
FIG. 1 is an exploded perspective view of a typical half-axle, constant velocity universal joint, and protective flexible boot.

FIG. 1 shows a typical axle shaft for one front wheel of a front wheel drive vehicle; the particular construction illustrated is for a General Motors Cadillac automobile. The parts of the axle and joint assembly are an axle shaft 10, an inner race 12 which slides onto a spline 13 at the end of the axle shaft, a bearing cage 14 and a plurality of ball bearings 15, and an outer race 17 in the form of a bell-shaped housing which has inner tracks or grooves (not shown) to engage the ball bearings and a splined outer spindle 18 which is attachable to the wheel spindle (not shown). The flexible boot 20 has a narrow inner end 21 which is held around the axle shaft, inboard of the spline by a small band clamp 22, and a larger body and outer end 25 which surrounds the universal joint and is held clamped to a cylindrical surface 27 on outer race 17 by a larger band clamp 30 (see FIG. 7 for detail). The boot is intended to cover the joint, protect it from dirt, water, etc., and to contain adequate lubricant for the joint. The boot is generally constructed as an integral thin-walled material, and is of sufficient size and elasticity to flex around the joint, accomodating the off-axis movements of the axle and the wheel spindle that accompany steering and/or suspension movements.

At the inner end of the axle assembly, an inner constant velocity joint may be used. This joint includes a carrier or spider 14A which fits onto the inner spline 13A of the axle shaft, and held in place by retainer rings 14B. The bearings 15A are carried on the arms of the spider, and having spherical surfaces which engage the tracks in the outer race 17A, which in turn is connected to the differential output (not shown). A flexible inner boot 20A covers the inner joint, and is secured by a small end clamp 22A and a larger band clamp 30A which has a press fit onto the exterior cylindrical surface 27A of the outer race 17A. Seal members 17B provide a seal between the housing/race 17A and the differential.

Figure 7:
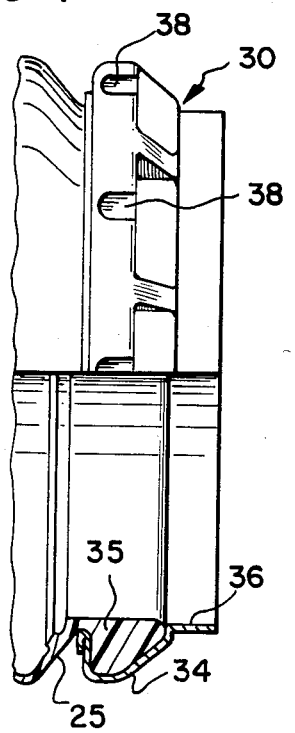
FIG. 7 is a side view, partially in cross-section, of a band clamp and a segment of the boot.

As seen in FIG. 7, the band clamp 30 is a thin-walled relatively rigid metallic member having a major body portion 34 which is generally U-shaped in cross-section to receive snugly the end rib 35 of the boot outer end, and also having an integral forward tip or edge 36 which is dimensioned to be a press fit with respect to the cylindrical surface on the outer race. The body 34 of the clamp may also include a number of reinforcing ribs 38 which tend to resist deformation of the ring-like clamp. Essentially the same construction detail applies to band clamp 30A.

Referring to FIG. 2, the principal parts of a tool as provided by this invention are shown in exploded form, surrounding an assembled outer constant velocity joint, with the boot having its narrow end 21 fitted to the axle shaft 10. A split main plate 40, having upper and lower sections 40A and 40B, is provided with ears 42 on the lower plate and having holes 43 which match with holes 44 in upper section 40A. When the plates are brought together and the holes 43,44 aligned, suitable retaining pins or bolts 45 are inserted through these holes, the sections 40A and 40B are co-planar, and the semi-circular openings 48A and 48B cooperate to define a circular aperture 48 of a specific size.

Figure 8:
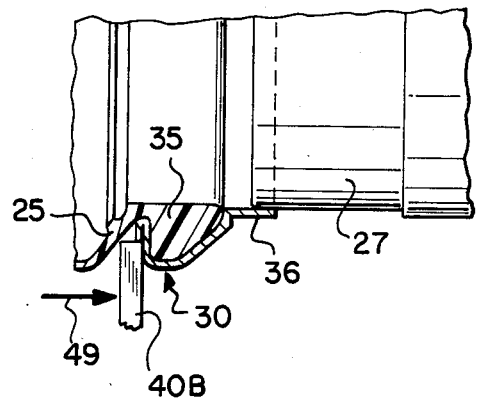
FIGS. 8 and 9 are partial cross-sectional views showing progressive movement of the band clamp onto the cylindrical surface.

The size of aperture 48 is precisely selected, so as to be slightly less in diameter than the body portion 34 of the band clamp, but sufficiently greater in diameter than the surface 27 and the adjoining end 25 of the boot so as to be slightly spaced from the outer surface of the boot. This spacing can be seen in FIG. 8, where a fragment of the lower plate part 40B is shown. Thus when the upper and lower plate parts are joined they surround the end of the boot, and can exert an end-wise force against the band clamp as indicated by arrow 49 in FIG. 8, but no part of the boot will be pinched between the surface 27 and aperture 48.

Each of the main plate sections also includes a stiffening and guide member in the form of strap flange members 50A and 50B which have one leg 52 attached (as by welding) to the outer region of the plate and another leg 53 extending outwardly of the surface of the plate, as seen in FIGS. 2 and 4.

The tool includes a means for supporting the main plate around the band clamp and for pressing the main plate against the band clamp, and such means preferably includes a secondary plate 60 having a central opening 62 of a diameter sufficient to fit around the enlarged end 63 of the spindle 18, thus locating the flat or back surface 64 of the secondary plate against the radially extending surface 55 on the outer race. The main and secondary plates have aligned holes 65 for receiving draw bolts 70 which are fitted through the holes 65 in the main plate parts 40A and 40B and held thereon by nuts 71; the dash lines in FIG. 2 indicate the path of these bolts through corresponding holes 65 in the secondary plate 60, through washers 72 and into nuts 74 which then may be tightened successively, a few turns at a time, to draw the plates together evenly and exert an essentially uniform force around and against the band clamp. It should be noted that there are different sets of these holes to allow different spacings of the bolts 70, according to the size of the joint being worked upon, or whether working on the inner or outer joint. Other means for pressing the plates together can be used, such as small hydraulic or pneumatic cylinders, but these are not illustrated since they are conventional items.

It is also possible to place the joined main plate 40 upon rails in a conventional hydraulic shop press, and then to press down on the spindle 18, or preferably on the secondary plate, to accomplish the same action. For this purpose the front side of the secondary plate is provided with adapter flanges 78, and a press plate adapter 80 (FIG. 6), provided with corresponding attachment flanges 82, can be fitted by joining the flanges with appropriate pins or bolts (not shown) extending through aligned holes 78A and 82A. Use of the secondary plate for this purpose avoids possible damage to the spline or threads.

Figure 9:
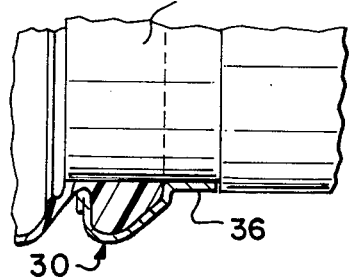

Using any of the aforementioned means to press the plates together, the band clamp is press fit onto the cylindrical surface 27. The main plate is moved concentrically along the surface 27 (or 27A) to maintain the requisite clearance with respect to the surrounded parts of the boot. The legs 53 of the stop flanges can engage the back of the secondary plate 60 to limit the movement of the main plate 40 as it pushes the band clamp 30 along the surface 27. The beginning and end of this action is illustrated generally in FIGS. 8 and 9. The beaded large end of the boot is drawn along with the band clamp, while being squeezed somewhat against the surface, but only by the retaining action of the clamp; the main plate does not press, pinch or pull directly against the elastomeric material of the boot.

Since the constant velocity joints, boots, and related parts may be used in several sizes, the invention also provides for sets of adapter plates 85A and 85B, with corresponding smaller sized apertures 87A and 87B, and holes 88 aligned with the pressing bolt holes in the main and secondary plates. The adapter plates 85A and 85B also have flanges 89 which fit along and inside the stop flanges 50A and 50B to locate the adapter plates accurately, even though the bolt holes may be worn, and retaining holes 53A and 89A can then be aligned to receive retaining pins or bolts (not shown). The retaining nuts 71 may then be fitted to the draw bolts 70, as shown in FIG. 2, to hold the reducing adapter plates 84A and 85B on the main plate sections 40A and 40B.

In addition, the reverse side of the secondary plate 60 has a protruding circular rib or bead 67 which is concentric with opening 62. This rib provides for proper alignment of the secondary plate 60 against the outer race/housing 17A when working on the inner joint, and avoids possible damage to the seal members 17B if they are in place.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool for press fitting a circular end of a flexible boot onto a cylindrical surface on the inner end of the outer race of a constant velocity joint using an endless band clamp which has a major portion with an inner diameter greater than the circumference of the cylindrical surface and being less than the outer diameter of the end of the boot, the clamp being fitted to the circular end of the boot, said tool comprising a multi-part main plate member having at least two parts which cooperate to define a circular aperture of a diameter less than the outer diameter and greater than the inner diameter of the major portion of the band clamp and also greater than the outer diameter of the end of the boot, means for releasably retaining said parts of said main plate member together whereby said parts can be separated to set main plate member around the end of the boot and then joined, means for pressing said main plate member coaxially and uniformly along the cylindrical surface of the outer race to force the band clamp and the end of the boot fitted thereto onto said surface and simultaneously to compress the end of the boot into tight sealing engagement with the surface of the outer race, said means for pressing including a secondary plate member having a central opening therethrough locateable on the outer race and means cooperating therewith supporting said main plate member in position with said aperture surrounding the band clamp and spaced from adjacent parts of the boot, and means for moving said main plate member and the outer race toward each other.

2. A tool as defined in claim 1, including adaptor plates fittable to said main plate member and defining a circular aperture concentric with but smaller than the aperture defined by said main plate member, said smaller aperture being of a size appropriate to fit around a correspondingly smaller boot and band clamp.

3. A tool for press fitting an endless band clamp encompassing the circular end of a flexible boot onto a cylindrical surface on the inner end of the outer race of a constant velocity joint, the clamp having a major portion with an inner diameter greater than the circumference of the surface and surrounding a rib on the end of the boot, said tool comprising a multi-part main plate member having at least two parts which cooperate to define a circular aperture of two parts which cooperate to define a circular aperture of a diameter less than the outer diameter and greater than the inner diameter of the major portion of the band clamp and also greater than the outer diameter of the end of the boot, means for releasably retaining said parts of said main plate member together in co-planar relationship whereby said parts can be separated to set said main plate member around the end of the boot and then joined, a secondary plate member having a central opening therethrough adapted to fit to the outer race opposite the cylindrical surface and in parallel relation to said main plate member, means on said secondary plate member supporting said main plate member outward from and coaxial with said secondary plate member whereby said main plate member is located around the band clamp and spaced from the boot when said secondary plate member is fitted to the outer race, and means for moving said main plate member and secondary plate member together causing said main plate member to advance coaxially and uniformly along the cylindrical surface to force the band clamp and the end of the boot fitted thereto onto said surface and simultaneously to compress the end of the boot into tight sealing engagement with the surface of the outer race.

4. A tool for press fitting a circular end of a flexible boot onto a cylindrical surface on the inner end of the outer race of a constant velocity joint using an endless band clamp having a major portion of U-shape in cross-section and being greater in diameter than the circumference of the surface and less than the outer diameter of the end of the boot, said major portion embracing a rib on the end of the boot, and the clamp having an integral tip dimensioned to be press fit onto the surface, said tool comprising
    a main multi-part plate member having a circular aperture of a diameter less than the outer diameter and greater than the inner diameter of the major portion of the band clamp and also greater than the outer diameter of the end of the boot,
    means locateable coaxially around said outer race opposite the cylindrical surface for supporting and locating said main plate member on the inner end of the outer race coaxially therewith and in position fitted around the end of the boot with a clearance and engaging a side of the band clamp, and
    means for pressing said main plate member coaxially and uniformly along the cylindrical surface of the outer race while moving said main plate member and said supporting and locating means toward each other to force the band clamp and the end of the boot fitted thereto onto said surface, and to compress the end of the boot into tight sealing engagement with the surface of the outer race, without pinching the boot between the plate member and the surface.

* * * * *